United States Patent
Xiang et al.

(10) Patent No.: US 12,477,517 B2
(45) Date of Patent: Nov. 18, 2025

(54) COMMUNICATION METHOD AND APPARATUS

(71) Applicant: Huawei Technologies Co., Ltd., Shenzhen (CN)

(72) Inventors: Hongyu Xiang, Beijing (CN); Lei Chen, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 18/351,111

(22) Filed: Jul. 12, 2023

(65) Prior Publication Data

US 2023/0354266 A1    Nov. 2, 2023

Related U.S. Application Data

(63) Continuation of application No. PCT/CN2021/086723, filed on Apr. 12, 2021.

(51) Int. Cl.
*H04W 68/02* (2009.01)

(52) U.S. Cl.
CPC .................. *H04W 68/02* (2013.01)

(58) Field of Classification Search
CPC .............. H04W 68/02; H04W 76/28
See application file for complete search history.

(56) References Cited

U.S. PATENT DOCUMENTS

| | | | | |
|---|---|---|---|---|
| 11,818,685 | B2* | 11/2023 | Hwang | H04W 52/0229 |
| 11,910,319 | B2* | 2/2024 | Liu | H04W 68/02 |
| 2017/0303235 | A1 | 10/2017 | Deogun et al. | |
| 2018/0352416 | A1 | 12/2018 | Ryu et al. | |
| 2019/0320490 | A1* | 10/2019 | Liu | H04W 24/10 |
| 2023/0038417 | A1* | 2/2023 | Wang | H04W 68/025 |
| 2023/0156661 | A1* | 5/2023 | Chen | H04W 76/28 455/458 |
| 2023/0224861 | A1* | 7/2023 | Al | H04W 76/28 370/329 |

(Continued)

FOREIGN PATENT DOCUMENTS

| | | |
|---|---|---|
| WO | 2019033112 A1 | 2/2019 |
| WO | 2020154622 A1 | 7/2020 |

OTHER PUBLICATIONS

3GPP TS 36.304 V16.3.0 (Dec. 2020), 3rd Generation Partnership Project; Technical Specification Group Radio Access Network; Evolved Universal Terrestrial Radio Access (E-UTRA); User Equipment (UE) procedures in idle mode (Release 16), Dec. 2020, total 64 pages.

(Continued)

*Primary Examiner* — Charles T Shedrick
(74) *Attorney, Agent, or Firm* — Slater Matsil, LLP

(57) ABSTRACT

A communication method and apparatus are disclosed. The method includes determining a first paging hyperframe (PH) based on a first extended discontinuous reception (eDRX) cycle, and determining a second PH based on a second eDRX cycle, where the first PH includes a first paging time window (PTW), and the second PH includes a second PTW; and monitoring a paging occasion (PO) in the first PTW and the second PTW, where if the first PH and the second PH are a same PH, a start position of the first PTW in the first PH is determined based on the first eDRX cycle and an offset.

18 Claims, 9 Drawing Sheets

(56) References Cited

U.S. PATENT DOCUMENTS

| | | | | |
|---|---|---|---|---|
| 2023/0292288 A1* | 9/2023 | Al | ............... | H04W 68/02 |
| 2024/0107625 A1* | 3/2024 | Sogabe | ............ | H04W 76/28 |
| 2024/0364478 A1* | 10/2024 | Wang | ............ | H04W 76/28 |
| 2025/0097845 A1* | 3/2025 | Lin | ............ | H04W 52/0235 |

OTHER PUBLICATIONS

Sony, "eDRX cycles for CM-CONNECTED with RRC inactive," 3GPP TSG-RAN WG2 Meeting #105, R2-1901431, Athens, Greece, Feb. 25-Mar. 1, 2019, total 4 pages.

Reply LS on eDRX cycles for CM-CONNECTED with RRC inactive, RAN WG2 Meeting #105, R2-1901430, Feb. 25-Mar. 1, 2019, Athens, Greece, total 1 page.

Qualcomm Incorporated, "Support for RRC-INACTIVE state with eDRX for 5GC CIoT," 3GPP TSG RAN WG2 #105, R2-1900426, Athens, Greece, Feb. 25-Mar. 1, 2018, total 4 pages.

Qualcomm, "[Draft] Response LS on on eDRX cycles for CM-CONNECTED with RRC inactive," 3GPP TSG RAN WG2 Meeting #105, R2-1900427, Athens, Greece, Feb. 25-Mar. 1, 2019, total 1 page.

3GPP TSG RAN WG2 Meeting #105, R2-1902431, "Response LS on on eDRX cycles for CM-CONNECTED with RRC inactive," Athens, Greece, Feb. 25-Mar. 1, 2019, total 2 pages.

* cited by examiner

COMMUNICATION METHOD AND APPARATUS

CROSS-REFERENCE TO RELATED APPLICATIONS

This application is a continuation of International Application No. PCT/CN2021/086723, filed on Apr. 12, 2021, which claims priority to International Patent Application No. PCT/CN2021/071548, filed on Jan. 13, 2021. The disclosures of the aforementioned applications are hereby incorporated by reference in their entireties.

TECHNICAL FIELD

This application relates to the field of wireless communication technologies, and in particular, to a communication method and apparatus.

BACKGROUND

In a system such as a new radio (NR) system, a terminal device in a radio resource control (RRC) idle mode or an RRC inactive mode may periodically wake up to monitor a paging message in a discontinuous reception (DRX) manner. A periodic wake-up cycle may be referred to as a DRX cycle, and a wake-up position is referred to as a paging occasion (PO). As shown in FIG. 1, the DRX cycle may include two parts: on duration and an opportunity for DRX. An "on duration" time includes at least one PO. An "opportunity for DRX" time does not include any PO. The terminal device is in a sleep mode to reduce power consumption. The terminal device performs blind detection at a start position of the PO. If a physical downlink control channel (PDCCH) is blindly detected, and a physical downlink shared channel (PDSCH) scheduled by the PDCCH includes a paging message for paging the terminal device, it is determined that the terminal device needs to switch to an RRC connected mode; otherwise, the terminal device needs to remain in the RRC idle mode or the RRC inactive mode.

In addition to DRX, the terminal device may further periodically wake up to monitor the PO by using an extended discontinuous reception (eDRX) mechanism. A periodic wake-up cycle may be referred to as an eDRX cycle. A difference between DRX and eDRX lies in different cycle duration, where the eDRX cycle is greater than the DRX cycle. Therefore, using the eDRX mechanism can increase sleep duration of the terminal device, and reduce a quantity of times that the terminal device periodically wakes up, to further reduce power consumption.

In the current discussion, a plurality of eDRX cycles may be configured for the terminal device. For example, a first eDRX cycle and a second eDRX cycle are configured. The terminal device may monitor, based on the first eDRX cycle, a paging message initiated by a core network (CN), and monitor, based on the second eDRX cycle, a paging message initiated by a radio access network (RAN).

With reference to the foregoing description, a current problem is that when the terminal device detects a paging message based on a plurality of eDRX cycles, power consumption of the terminal device is increased, and consequently a standby time of the terminal device is reduced.

SUMMARY

An objective of implementations of this application is to provide a communication method and apparatus to reduce power consumption of a terminal device, thereby increasing a standby time of the terminal device.

According to a first aspect, this application provides a communication method. The method is applicable to a scenario in which a terminal device monitors a PO by using an eDRX mechanism. The method is performed by the terminal device or a module in the terminal device. An example in which the method is performed by the terminal device is used herein for description. The method includes: determining a first PH based on a first eDRX cycle, and determining a second PH based on a second eDRX cycle, where the first PH includes a first PTW, and the second PH includes a second PTW; and monitoring a PO in the first PTW and the second PTW, where if the first PH and the second PH are a same PH, a start position of the first PTW in the first PH is determined based on the first eDRX cycle and an offset.

In a possible implementation, the determining a first paging hyperframe PH based on a first eDRX cycle includes: determining the first PH based on the first eDRX cycle and a PH offset, where the PH offset is determined based on the first eDRX cycle and the second eDRX cycle.

By implementing the method described in the first aspect, the first PH is determined based on the first eDRX cycle and the PH offset, and the second PH is determined based on the second eDRX cycle, so that the first PH and the second PH can be a same PH. If the first PH is determined by using the same method used to determine the second PH, that is, the first PH is determined only based on the first eDRX cycle, a scenario in which the first PH and the second PH are a same PH may not occur.

According to the method described in the first aspect, when the first PH and the second PH are a same PH, the terminal device may determine the start position of the first PTW based on the first eDRX cycle and the offset, so that the first PTW and the second PTW overlap in time domain. In this way, total duration in which the terminal device needs to be woken up in the first PH can be reduced, and power consumption of the terminal device can be reduced.

In a possible implementation, the first PTW and the second PTW overlap in time domain.

When the first PTW and the second PTW overlap in time domain, some POs in the first PTW overlap some POs in the second PTW, and two overlapped POs need to be monitored only once. Therefore, a total quantity of POs that need to be monitored by the terminal device can be reduced, and power consumption of the terminal device can be reduced, thereby improving paging message monitoring efficiency.

In a possible implementation, the offset is a difference between a second parameter value and a first parameter value. The second parameter value is determined based on an identifier of the terminal device and the second eDRX cycle, and the first parameter value is determined based on the identifier of the terminal device and the first eDRX cycle.

According to the method, the start position of the first PTW and a start position of the second PTW may overlap in the first PH. In this case, the total duration in which the terminal device needs to be woken up in the first PH is the smallest, and a total quantity of POs that need to be monitored is the smallest, thereby significantly reducing the power consumption of the terminal device.

In a possible implementation, the second parameter value is used to determine a system frame number SFN corresponding to a start position of the second PTW, the first parameter value is used to determine an SFN corresponding to a start position of a third PTW, and the third PTW is a PTW determined in the first PH based on the first eDRX cycle.

In a possible implementation, the offset is greater than a first threshold and less than a second threshold. The first threshold is a difference between an SFN corresponding to a start position of the second PTW and an SFN corresponding to an end position of a third PTW, the second threshold is a difference between an SFN corresponding to an end position of the second PTW and an SFN corresponding to a start position of the third PTW, and the third PTW is a PTW determined in the first PH based on the first eDRX cycle.

In a possible implementation, the first eDRX cycle, the second eDRX cycle, and/or the offset are/is from a network device.

In a possible implementation, if the first PH and the second PH are different PHs, a start position of the first PTW in the first PH is determined based on the first eDRX cycle.

According to a second aspect, this application provides a communication method. The method is applicable to a scenario in which a terminal device monitors a PO by using an eDRX mechanism. The method is performed by a network device or a module in a network device. An example in which the method is performed by the network device is used herein for description. The method includes: determining a first paging hyperframe PH based on a first extended discontinuous reception eDRX cycle, and determining a second PH based on a second eDRX cycle, where the first PH includes a first paging time window PTW, and the second PH includes a second PTW; and when determining to page the terminal device, scheduling a paging message in the first PTW and/or the second PTW, where if the first PH and the second PH are a same PH, a start position of the first PTW in the first PH is determined based on the first eDRX cycle and an offset.

In a possible implementation, the determining a first paging hyperframe PH based on a first eDRX cycle includes: determining the first PH based on the first eDRX cycle and a PH offset, where the PH offset is determined based on the first eDRX cycle and the second eDRX cycle.

In a possible implementation, the first PTW and the second PTW overlap in time domain.

In a possible implementation, the offset is a difference between a second parameter value and a first parameter value. The second parameter value is determined based on an identifier of the terminal device and the second eDRX cycle, and the first parameter value is determined based on the identifier of the terminal device and the first eDRX cycle.

In a possible implementation, the second parameter value is used to determine a system frame number SFN corresponding to a start position of the second PTW, the first parameter value is used to determine an SFN corresponding to a start position of a third PTW, and the third PTW is a PTW determined in the first PH based on the first eDRX cycle.

In a possible implementation, the offset is greater than a first threshold and less than a second threshold. The first threshold is a difference between an SFN corresponding to a start position of the second PTW and an SFN corresponding to an end position of a third PTW, the second threshold is a difference between an SFN corresponding to an end position of the second PTW and an SFN corresponding to a start position of the third PTW, and the third PTW is a PTW determined in the first PH based on the first eDRX cycle.

In a possible implementation, the first eDRX cycle, the second eDRX cycle, and/or the offset are/is from the network device.

In a possible implementation, if the first PH and the second PH are different PHs, a start position of the first PTW in the first PH is determined based on the first eDRX cycle.

According to a third aspect, this application provides a communication method. The method is applicable to a scenario in which a terminal device monitors a PO by using an eDRX mechanism. The method is performed by the terminal device or a module in the terminal device. An example in which the method is performed by the terminal device is used herein for description. The method includes: determining a first paging hyperframe PH based on a first eDRX cycle, and determining a second PH based on a second eDRX cycle, where the first PH includes a first PTW, and the second PH includes a second PTW; and monitoring a PO in the first PTW and the second PTW, where if the first PH and the second PH are a same PH, both a start position of the first PTW and a start position of the second PTW are determined based on the first eDRX cycle, or both a start position of the first PTW and a start position of the second PTW are determined based on the second eDRX cycle.

According to the method, the start position of the first PTW and a start position of the second PTW may overlap in the first PH. In this case, the total duration in which the terminal device needs to be woken up in the first PH is the smallest, and a total quantity of POs that need to be monitored is the smallest, thereby significantly reducing the power consumption of the terminal device.

In a possible implementation, the determining a first paging hyperframe PH based on a first eDRX cycle includes: determining the first PH based on the first eDRX cycle and a PH offset, where the PH offset is determined based on the first eDRX cycle and the second eDRX cycle.

In a possible implementation, if the first PH and the second PH are different PHs, the start position of the first PTW is determined based on the first eDRX cycle, and the start position of the second PTW is determined based on the second eDRX cycle.

In a possible implementation, the first eDRX cycle, the second eDRX cycle, and/or the offset are/is from a network device.

According to a fourth aspect, this application provides a communication method. The method is applicable to a scenario in which a terminal device monitors a PO by using an eDRX mechanism. The method is performed by a network device or a module in a network device. An example in which the method is performed by the network device is used herein for description. The method includes: determining a first paging hyperframe PH based on a first extended discontinuous reception eDRX cycle, and determining a second PH based on a second eDRX cycle, where the first PH includes a first paging time window PTW, and the second PH includes a second PTW; and when determining to page the terminal device, scheduling a paging message in the first paging time window PTW and/or the second PTW, where if the first PH and the second PH are a same PH, both a start position of the first PTW and a start position of the second PTW are determined based on the first eDRX cycle, or both a start position of the first PTW and a start position of the second PTW are determined based on the second eDRX cycle.

In a possible implementation, the determining a first paging hyperframe PH based on a first eDRX cycle includes: determining the first PH based on the first eDRX cycle and a PH offset, where the PH offset is determined based on the first eDRX cycle and the second eDRX cycle.

In a possible implementation, if the first PH and the second PH are different PHs, the start position of the first PTW is determined based on the first eDRX cycle, and the start position of the second PTW is determined based on the second eDRX cycle.

In a possible implementation, the first eDRX cycle, the second eDRX cycle, and/or the offset are/is from a network device.

According to a fifth aspect, this application provides a communication method. The method is applicable to a scenario in which a terminal device monitors a PO by using an eDRX mechanism. The method is performed by the terminal device or a module in the terminal device. An example in which the method is performed by the terminal device is used herein for description. The method includes: determining a first paging frame PF based on a paging frame offset, where the first PF and a second PF are a same PF, the first PF is a PF in a radio access network RAN paging cycle, and the second PF is any PF in a paging time window PTW in a second eDRX cycle; and monitoring a PO in the first PF.

According to the method, a PO in the first PF can overlap a PO in the second PF. In this case, a total quantity of POs that need to be monitored by the terminal device is reduced, power consumption of the terminal device can be reduced, and monitoring efficiency can be improved.

In a possible implementation, the paging frame offset is a difference between a frame number of the second PF and a frame number of a third PF, and the third PF is a PF determined based on the RAN paging cycle.

In a possible implementation, the paging frame offset from a network device is received.

According to a sixth aspect, this application provides a communication method. The method is applicable to a scenario in which a terminal device monitors a PO by using an eDRX mechanism. The method is performed by a network device or a module in a network device. An example in which the method is performed by the network device is used herein for description. The method includes: determining a first paging frame PF based on a paging frame offset, where the first PF and a second PF are a same PF, the first PF is a PF in a radio access network RAN paging cycle, and the second PF is any PF in a paging time window PTW in a second eDRX cycle; and when determining to page the terminal device, scheduling a paging message in the first PF.

In a possible implementation, the paging frame offset is a difference between a frame number of the second PF and a frame number of a third PF, and the third PF is a PF determined based on the RAN paging cycle.

In a possible implementation, the method further includes: indicating the paging frame offset to the terminal device.

According to a seventh aspect, this application further provides a communication apparatus. The communication apparatus implements any method provided in the first aspect, the third aspect, or the fifth aspect. The communication apparatus may be implemented by hardware, or may be implemented by hardware executing corresponding software. The hardware or software includes one or more units or modules corresponding to the foregoing functions.

In a possible implementation, the communication apparatus includes a processor, and the processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes an interface circuit, and the interface circuit is configured to support communication between the communication apparatus and a device such as a network device.

In a possible implementation, the communication apparatus includes corresponding functional modules, respectively configured to implement the steps in the foregoing method. The functions may be implemented by hardware, or may be implemented by hardware executing corresponding software. The hardware or software includes one or more modules corresponding to the foregoing functions.

In a possible implementation, a structure of the communication apparatus includes a processing unit and a communication unit. These units may perform corresponding functions in the foregoing method examples. For details, refer to descriptions in the method provided in the first aspect, the third aspect, or the fifth aspect. Details are not described herein again.

According to an eighth aspect, this application further provides a communication apparatus. The communication apparatus implements any method provided in the second aspect, the fourth aspect, or the sixth aspect. The communication apparatus may be implemented by hardware, or may be implemented by hardware executing corresponding software. The hardware or software includes one or more units or modules corresponding to the foregoing functions.

In a possible implementation, the communication apparatus includes a processor, and the processor is configured to support the communication apparatus in performing a corresponding function of the network device in the foregoing method. The communication apparatus may further include a memory. The memory may be coupled to the processor, and the memory stores program instructions and data that are necessary for the communication apparatus. Optionally, the communication apparatus further includes an interface circuit, and the interface circuit is configured to support communication between the communication apparatus and a device such as a terminal device.

In a possible implementation, the communication apparatus includes corresponding functional modules, respectively configured to implement the steps in the foregoing method. The functions may be implemented by hardware, or may be implemented by hardware executing corresponding software. The hardware or software includes one or more modules corresponding to the foregoing functions.

In a possible implementation, a structure of the communication apparatus includes a processing unit and a communication unit. These units may perform corresponding functions in the foregoing method examples. For details, refer to descriptions in the method provided in the second aspect, the fourth aspect, or the sixth aspect. Details are not described herein again.

According to a ninth aspect, a communication apparatus is provided. The communication apparatus includes a processor and an interface circuit. The interface circuit is configured to: receive a signal from a communication apparatus other than the communication apparatus, and transmit the signal to the processor; or send a signal from the processor to a communication apparatus other than the communication apparatus. The processor is configured to implement the method according to any one of the first aspect, the third aspect, the fifth aspect, or any possible implementation of any one of the foregoing aspects by using a logic circuit or by executing code instructions.

According to a tenth aspect, a communication apparatus is provided. The communication apparatus includes a processor and an interface circuit. The interface circuit is configured to: receive a signal from a communication apparatus other than the communication apparatus, and transmit the signal to the processor; or send a signal from the processor to a communication apparatus other than the communication apparatus. The processor is configured to implement a functional module of the method according to any one of the second aspect, the fourth aspect, the sixth aspect, or any possible implementation of any one of the foregoing aspects by using a logic circuit or by executing code instructions.

According to an eleventh aspect, a computer-readable storage medium is provided. The computer-readable storage medium stores a computer program or instructions. When the computer program or instructions are executed by a processor, the method according to any one of the first aspect to the sixth aspect and any possible implementation of any one of the foregoing aspects is implemented.

According to a twelfth aspect, a computer program product storing instructions is provided. When the instructions are run by a processor, the method according to any one of the first aspect to the sixth aspect and any possible implementation of any one of the foregoing first aspect to the sixth aspect is implemented.

According to a thirteenth aspect, a chip system is provided. The chip system includes a processor, and may further include a memory, configured to implement the method according any one of the first aspect to the sixth aspect and any possible implementation of any one of the foregoing aspects. The chip system may include a chip, or may include a chip and another discrete device.

According to a fourteenth aspect, a communication system is provided. The system includes the apparatus (for example, a terminal device) according to the ninth aspect and the apparatus (for example, a network device) according to the tenth aspect.

BRIEF DESCRIPTION OF THE DRAWINGS

FIG. 4(*b*) is a schematic diagram of eDRX paging according to an embodiment of this application;

DETAILED DESCRIPTION OF ILLUSTRATIVE EMBODIMENTS

The following further describes embodiments of this application in detail with reference to the accompanying drawings.

Technical solutions in the embodiments of this application may be applied to various communication systems, for example, a long term evolution (LTE) system, an NR system, and a next generation communication system. This is not limited herein.

In the embodiments of this application, a terminal device may be a device with a wireless transceiver function or a chip that may be disposed in any device, and may also be referred to as user equipment (UE), an access terminal, a subscriber unit, a subscriber station, a mobile station, a remote station, a remote terminal, a mobile device, a user terminal, a wireless communication device, a user agent, or a user apparatus. The terminal device in the embodiments of this application may be a mobile phone, a tablet computer (Pad), a computer with a wireless transceiver function, a virtual reality (VR) terminal, an augmented reality (AR) terminal, a wireless terminal in industrial control, a wireless terminal in self driving, or the like.

A network device may be a next generation NodeB (gNB) in an NR system, an evolved NodeB (eNB) in an LTE system, or the like.

Figure 1:
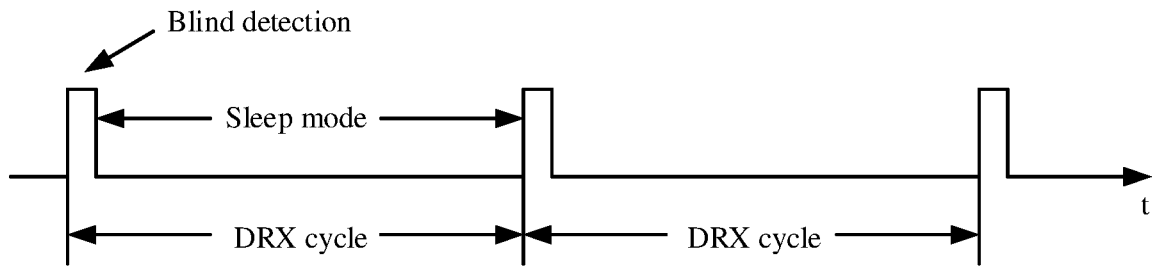
FIG. 1 is a schematic diagram of DRX paging.
Figure 2:
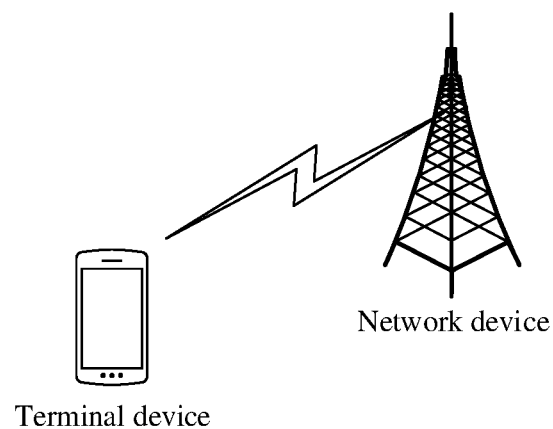
FIG. 2 is a schematic diagram of a network architecture applicable to this application.

FIG. 2 is a schematic diagram of a network architecture applicable to this application. As shown in FIG. 2, a terminal device may access a network device to obtain a service of an external network (for example, a data network (DN)) by using the network device, or communicate with another device by using the network device, for example, communicate with another terminal device.

In FIG. 2, the terminal device may be configured to be in an RRC idle mode, an RRC inactive mode, or an RRC active mode. A terminal device in the RRC idle mode needs to monitor a paging message from a CN. A terminal device in the RRC inactive mode needs to monitor a paging message from the CN and a paging message from a RAN. The paging message from the RAN may be briefly referred to as a RAN paging message, and is a paging message sent to the terminal device in a RAN-based notification area (RNA) when an access network device (for example, a base station) receives data or signaling that needs to be sent to the terminal device. The paging message from the CN may be briefly referred as a CN paging message, and is a paging message sent to the terminal device by using an access network device (for example, a base station) when a core network device needs to page the terminal device.

A process in which the terminal device monitors the paging message is as follows: The terminal device monitors a PDCCH at a PO, and determines, based on the monitored PDCCH, whether a paging message that needs to be received by the terminal device exists. When the monitored PDCCH includes downlink control information (DCI) scrambled by using a paging radio network temporary identity (P-RNTI), a paging message is received on a PDSCH scheduled by using the DCI. If it is determined that the paging message is a paging message for paging the terminal device, the terminal device switches to the RRC connected mode; or otherwise, maintains the RRC idle mode or the RRC inactive mode.

Because the terminal device in the RRC inactive state needs to monitor the CN paging message and the RAN paging message, two sets of parameters may be configured for the terminal device. One set of parameters is used to monitor the CN paging message, and the other set of parameters is used to monitor the RAN paging message. The parameter used to monitor the CN paging message may include information such as an eDRX cycle and a window length of a paging time window (PTW). The parameter used to monitor the RAN paging message may include information such as an eDRX cycle and a window length of a PTW, or the parameter used to monitor the RAN paging message may include a RAN paging cycle.

Figure 3:
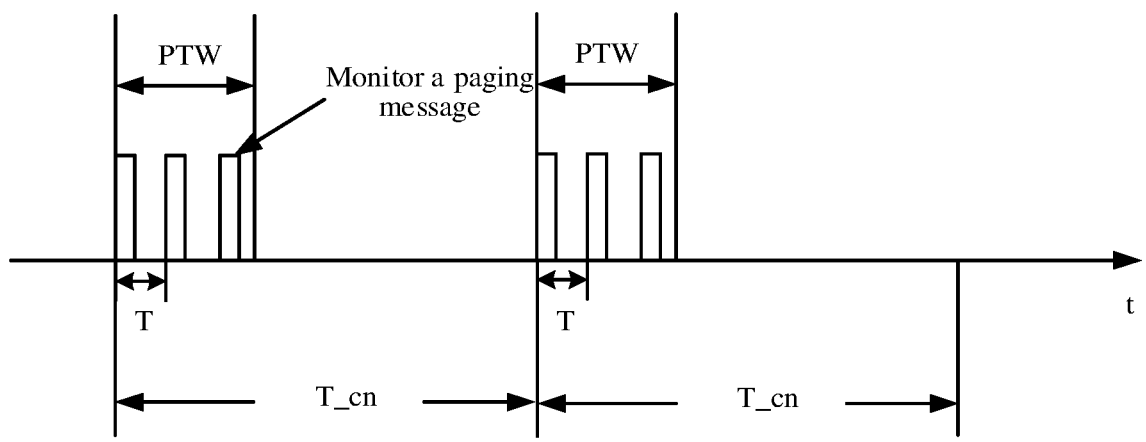
FIG. 3 is a schematic diagram of eDRX paging according to an embodiment of this application.

It is assumed that an eDRX cycle corresponding to the CN paging message is expressed by T_cn, and an eDRX cycle corresponding to the RAN paging message is expressed by T_ran. A PTW is configured for the eDRX cycle corresponding to the CN paging message. As shown in FIG. 3, in the eDRX cycle T_cn corresponding to the CN paging message, the terminal device enters a sleep mode outside the PTW, and the terminal device monitors the CN paging message based on a cycle T inside the PTW.

Figure 4A:
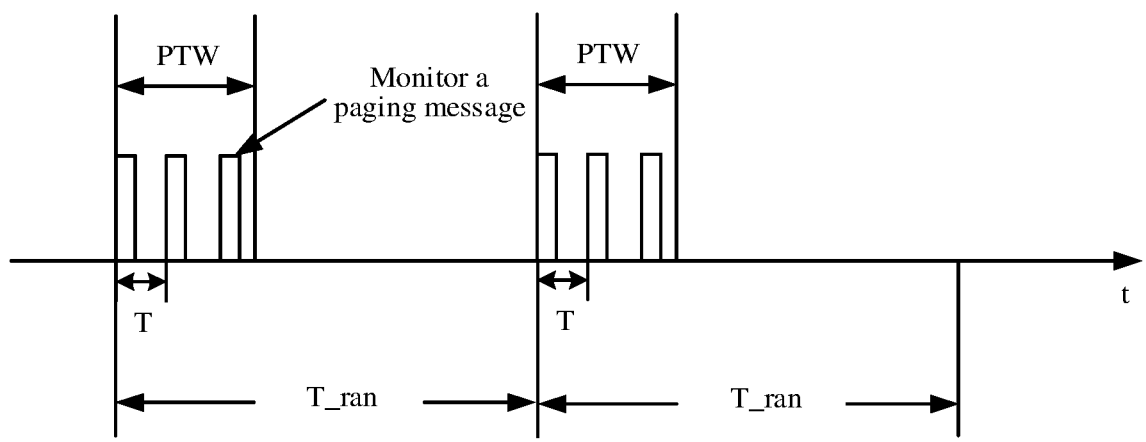
FIG. 4(*a*) is a schematic diagram of eDRX paging according to an embodiment of this application.
Figure 4B:
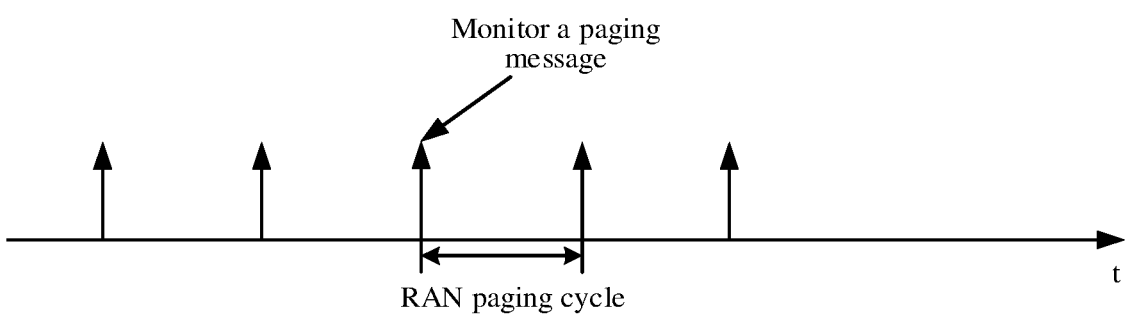

For the RAN paging message, when the PTW is configured, as shown in FIG. 4(a), the terminal device enters the sleep mode outside the PTW, and the terminal device monitors the paging message based on the cycle T inside the PTW. When no PTW is configured, as shown in FIG. 4(b), the terminal device monitors the RAN paging message based on a RAN paging cycle.

T in FIG. 3 and FIG. 4(a) is the smallest value among a cycle of the RAN paging message (briefly referred to as a RAN paging cycle below), a specific paging cycle (if configured) of the terminal device, and a default paging cycle. The default paging cycle is broadcast by the network device. If the RAN paging cycle and the specific paging cycle are not configured, the paging message is monitored by using the default paging cycle.

It should be noted that when a PTW exists, in a process in which the terminal device monitors the paging message, the terminal device needs to determine a paging hyperframe (PH) including the PTW and a system frame number (SFN) of a system frame in which a start position of the PTW is located. The terminal device may determine, in the PTW, a position of a paging frame (PF) including a PO, to perform monitoring at the PO in the PF.

The PH may be determined by using the following formula, and hyperframes corresponding to all hyper-system frame numbers (H-SFN) satisfying the formula may be used as PHs:

$$\text{H-SFN} \bmod T_{eDRX,H} = (\text{UE\_ID} \bmod T_{eDRX,H}) \quad (1)$$

$T_{eDRX,H}$ is the eDRX cycle, UE_ID is determined based on an identifier of the terminal device, and mod indicates a modulo operation.

A system frame number SFN of the system frame in which the start position of the PTW is located satisfies the following formula:

$$\text{SFN} = 256 * i_{eDRX}, i_{eDRX} = \text{floor}(\text{UE\_ID}/T_{eDRX,H}) \bmod 4 \quad (2)$$

floor ( ) indicates a round-down operation.
The SFN of the PF satisfies the following formula:

$$(\text{SFN} + \text{PF\_offset}) \bmod T = (T \text{ div } N) * (\text{UE\_ID} \bmod N) \quad (3)$$

T is the smallest value among the RAN paging cycle, the specific paging cycle of the terminal device, and the default paging cycle.

The subscript i_s of the PO satisfies the following formula:

$$i\_s = \text{floor}(\text{UE\_ID}/N) \bmod N \quad (4)$$

PF_offset is an offset used to determine a PF and is carried in a system information block 1 (SIB1) sent by the network device, N is a total quantity of PFs included in the PTW, and Ns indicates a quantity of POs included in one PF.

It can be learned from the foregoing description that when a plurality of sets of parameters are configured for the terminal device, a quantity of times that the terminal device needs to monitor a paging message increases, thereby increasing power consumption of the terminal device, and causing a decrease in a standby time of the terminal device. Therefore, this application provides a method to reduce a quantity of times that the terminal device needs to monitor a paging message, thereby reducing power consumption of the terminal device.

The network architecture and the service scenario that are described in this application are intended to describe the technical solutions in this application more clearly, but do not constitute a limitation on the technical solutions provided in this application. A person of ordinary skill in the art may know that with evolution of the network architecture and emergence of a new service scenario, the technical solutions provided in this application are also applicable to similar technical problems.

In this application, interaction between the network device and the terminal device is used as an example for description. Alternatively, an operation performed by the network device may be performed by a chip or module inside the network device, and an operation performed by the terminal device may be performed by a chip or module inside the terminal device.

Figure 5:
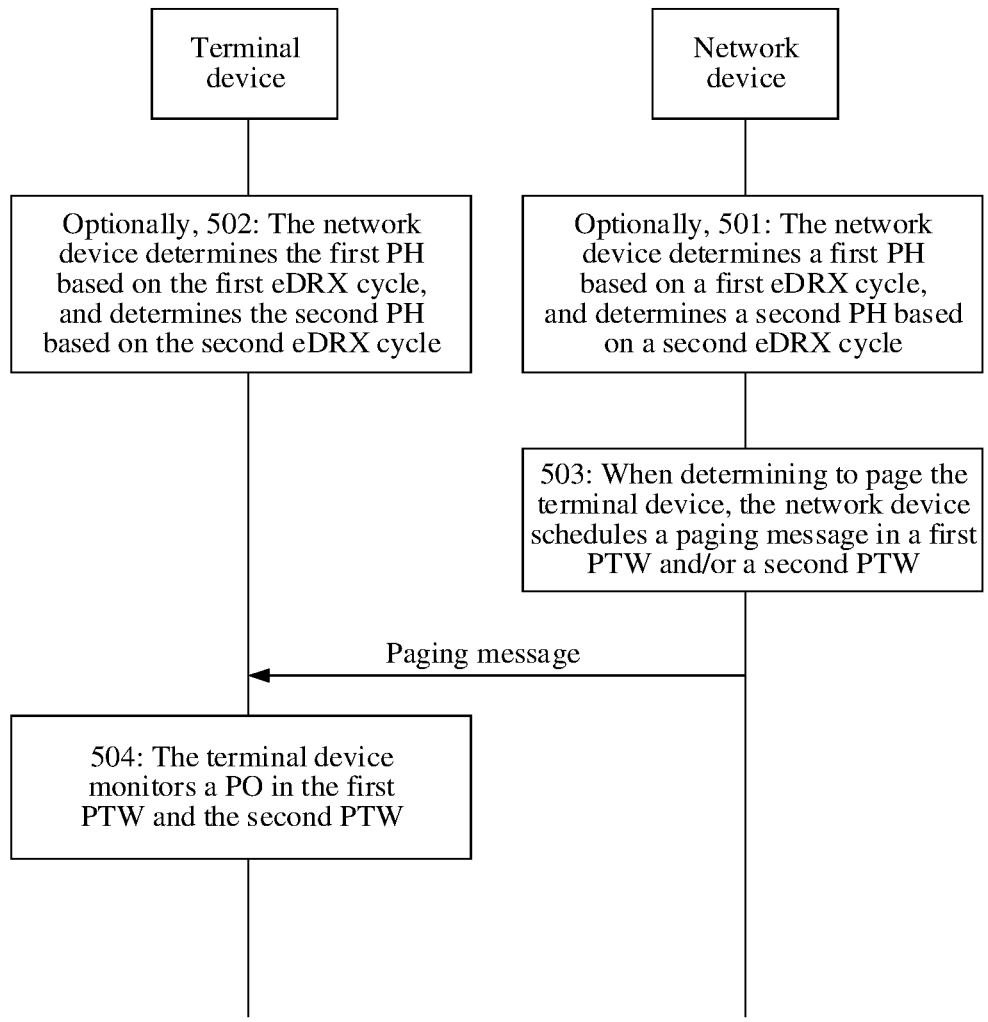
FIG. 5 is a schematic flowchart of a communication method according to an embodiment of this application.

With reference to the foregoing descriptions, FIG. 5 is a schematic flowchart of a communication method according to an embodiment of this application. As shown in FIG. 5, the method includes the following steps.

Optionally, S501: A network device determines a first PH based on a first eDRX cycle, and determines a second PH based on a second eDRX cycle.

Optionally, S502: A terminal device determines the first PH based on the first eDRX cycle, and determines the second PH based on the second eDRX cycle.

The first PH includes a first PTW, and the second PH includes a second PTW.

It should be noted that the terminal device may be in an RRC inactive mode, and may further support monitoring of a paging message by using two eDRX cycles. An execution sequence of S501 and S502 is not limited. S501 and S502 may be performed sequentially or simultaneously.

In the procedure in FIG. 5, the first PTW is configured in the first eDRX cycle, and the second PTW is configured in the second eDRX cycle. In this embodiment of this application, the network device may configure information such as the first eDRX cycle and the second eDRX cycle for the terminal device. For example, it is assumed that the first eDRX cycle is used to receive a RAN paging message, and the second eDRX cycle is used to receive a CN paging message. The network device may send first configuration information to the terminal device. The first configuration information includes the first eDRX cycle, and the first configuration information may further include information such as a window length of the first PTW in the first eDRX cycle.

The first configuration information may be carried by using RRC signaling. For example, the first configuration information may be carried by using an RRC connection release message or an RRC release message. The first configuration information may further include an offset, and the offset may be used to determine a start position of the first PTW. When the network device does not configure the offset for the terminal device, the offset may be determined by the terminal device, or may be determined in another manner. This is not limited in this embodiment of this application.

The network device may further send second configuration information to the terminal device. The second configuration information includes the second eDRX cycle, and the second configuration information may further include information such as a window length of the second PTW in the second eDRX cycle. The second configuration information may be sent to the terminal device in an attach process or a tracking area update (TAU) process. For example, the second configuration information may be carried in an attach request message in the attach process, or the second configuration information may be carried in a TAU request message in the TAU process.

It should be noted that in the procedure in FIG. 5, the first eDRX cycle and the second eDRX cycle are in units of a hyper-system frame, the first eDRX cycle includes at least one hyper-system frame, and the second eDRX cycle includes at least one hyper-system frame.

In this embodiment of this application, the first PH and the second PH may be determined by using Formula (1). For example, with reference to Formula (1), the hyper-system frame number H-SFN1 corresponding to the first PH may satisfy the following formula:

$$\text{H-SFN}_1 \bmod T^1_{eDRX,H} = (\text{UE\_ID} \bmod T^1_{eDRX,H}) \quad (5\text{-}1)$$

$T^1_{eDRX,H}$ indicates the first eDRX cycle, UE_ID is determined based on an identifier of the terminal device, for example, an international mobile subscriber identity (IMSI), UE_ID may be equal to IMSI mod 1024, and mod indicates a modulo operation.

Correspondingly, the hyper-system frame number H-SFN$_2$ corresponding to the second PH may satisfy the following formula:

$$\text{H-SFN}_2 \bmod T^2_{eDRX,H} = (\text{UE\_ID} \bmod T^2_{eDRX,H}) \quad (6)$$

$T^2_{eDRX,H}$ indicates the second eDRX cycle.

As can be learned from the foregoing process, if the first eDRX cycle is equal to the second eDRX cycle, the first PH and the second PH are actually a same PH; or if the first eDRX cycle is not equal to the second eDRX cycle, the following two possible scenarios exist at every interval of a constant quantity of hyper-system frames:

Scenario 1: A hyper-system frame number corresponding to the first PH and a hyper-system frame number corresponding to the second PH may be the same, that is, the first PTW and the second PTW are located in a same PH at every interval of a constant quantity of hyper-system frames. A value of the constant quantity may be a least common multiple of the first eDRX cycle and the second eDRX cycle.

Figure 6:
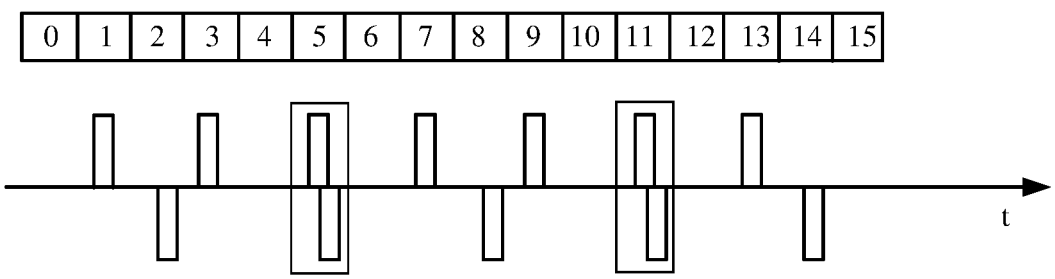
FIG. 6 is a schematic diagram of a position relationship between a first PTW and a second PTW according to an embodiment of this application.

For example, as shown in FIG. 6, it is assumed that a value of UE_ID is 5, a value of the first eDRX cycle is 2 hyper-system frames, and a value of the second eDRX cycle is 3 hyper-system frames. With reference to Formulas (5-1) and (6), the value of the hyper-system frame number H-SFN1 corresponding to the first PH is sequentially 1, 3, 5, 7, 9, 11, and the like; and the value of the hyper-system frame number H-SFN2 corresponding to the second PH is sequentially 2, 5, 8, 11, 14, and the like. It can be learned from the foregoing process that the first PTW and the second PTW are located in a same PH at an interval of every 6=2×3 hyper-system frames.

Scenario 2: The hyper-system frame number corresponding to the first PH and the hyper-system frame number corresponding to the second PH are different. In this case, a PH offset may be additionally introduced to determine the first PH. In this scenario, the first PH may be determined based on the PH offset, the first eDRX cycle, and the identifier of the terminal device. For example, a formula used to determine the first PH may satisfy the following formula:

$$(\text{H-SFN}_1 + \text{offset}_{PH}) \bmod T^1_{eDRX,H} = (\text{UE\_ID} \bmod T^1_{eDRX,H}) \quad (5\text{-}2)$$

offset$_{PH}$ is the PH offset, meanings of other parameters are the same as those in Formula (5-1). Details are not described herein again.

In the scenario 2, the PH offset is used to compensate for an interval between the first PH and the second PH, so that the first PH and the second PH that are determined based on the PH offset correspond to a same hyper-system frame number at every interval of a constant quantity of hyper-system frames. Therefore, the first PTW in the first PH and the second PTW in the second PH are located in a same PH. A value of the constant quantity may be a least common multiple of the first eDRX cycle and the second eDRX cycle.

Figure 17:
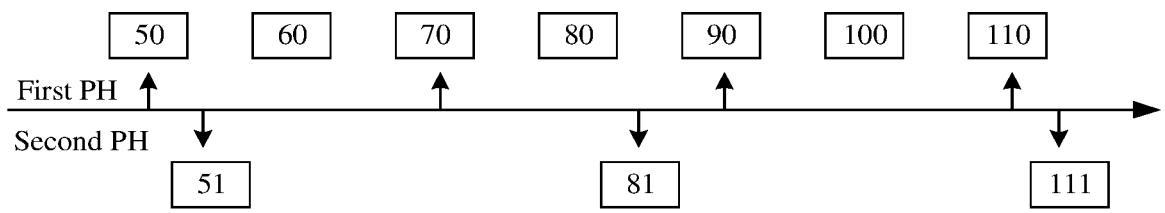
FIG. 17 is a schematic diagram of a position relationship between a first PTW and a second PTW according to an embodiment of this application.
Figure 18:
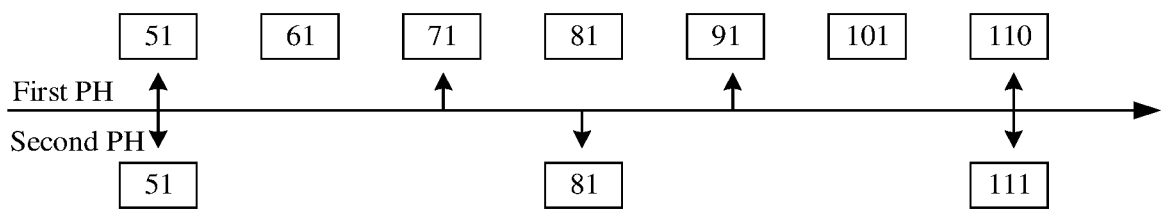
FIG. 18 is a schematic diagram of a position relationship between a first PTW and a second PTW according to an embodiment of this application.

For example, as shown in FIG. 17, it is assumed that a value of the first eDRX cycle is 20 hyper-system frames, and a value of the second eDRX cycle is 30 hyper-system frames. It is assumed that the hyper-system frame number H-SFN$_1$ corresponding to the first PH is sequentially 30, 50, 70, 90, 110, and the like; and the hyper-system frame number H-SFN$_2$ corresponding to the second PH is sequentially 21, 51, 81, 111, 141, and the like. It can be learned from the foregoing process that the first PTW and the second PTW can never be located in a same PH. To enable the first PTW and the second PTW to be located in a same PH, the first PH may be determined by using a PH offset offset$_{PH}$ whose value is 1. As shown in FIG. 18, a value of the hyper-system frame number H-SFN$_1$ corresponding to the first PH determined based on the PH offset is sequentially 31, 51, 71, 91, 11, and the like, and the first PTW and the second PTW are located in a same PH at an interval of every 60=2×30 hyper-system frames. In FIG. 18, when the hyper-system frame number is 51 and 11, the first PTW and the second PTW are located in a same PH.

In this embodiment of this application, on a network side or a terminal device side, whether the hyper-system frame number corresponding to the first PH and the hyper-system frame number corresponding to the second PH may be the same can be determined based on the first eDRX cycle, the second eDRX cycle, and UE_ID. If the hyper-system frame number corresponding to the first PH and the hyper-system frame number corresponding to the second PH may be the same, it may be considered that this case corresponds to the scenario 1, that is, the first PH does not need to be determined by using the PH offset. If the hyper-system frame number corresponding to the first PH and the hyper-system frame number corresponding to the second PH may be different, it may be considered that this case corresponds to the scenario 2, that is, the first PH needs to be determined by using the PH offset. It should be noted that in the scenario in which the hyper-system frame number corresponding to the first PH and the hyper-system frame number corresponding to the second PH may be the same, to determine the position of the first PH more flexibly, the first PH may alternatively be determined by using the PH offset.

On the network side, the PH offset $\text{offset}_{PH}$ may be determined in the following manners:

Manner 1: When a CN determines the second eDRX cycle (namely, an IDLE eDRX cycle), and a RAN determines the first eDRX cycle (namely, an INACTIVE eDRX cycle), the CN determines the PH offset. In this case, the RAN feeds back the first eDRX cycle to the CN, and the CN obtains the PH offset offsetPH based on the first eDRX cycle and the second eDRX cycle.

Manner 2: When the CN determines the second eDRX cycle (namely, the IDLE eDRX cycle), and the RAN determines the first eDRX cycle (namely, the INACTIVE eDRX cycle), the RAN determines the PH offset. In this case, the CN notifies the RAN of the second eDRX cycle, for example, notifies the RAN by using core network assistance information for RRC INACTIVE, and the RAN obtains the PH offset offsetPH based on the first eDRX cycle and the second eDRX cycle.

Manner 3: When the CN determines the second eDRX cycle (namely, the IDLE eDRX cycle) and the first eDRX cycle (namely, the INACTIVE eDRX cycle), the CN determines the PH offset. In this case, the CN obtains the PH offset offsetPH based on the first eDRX cycle and the second eDRX cycle.

Correspondingly, for the terminal device, the PH offset $\text{offset}_{PH}$ may be configured on the network side, that is, after the PH offset $\text{offset}_{PH}$ is determined on the network side, the terminal device is notified by using RRC signaling or NAS signaling. Alternatively, the terminal device may determine the PH offset $\text{offset}_{PH}$ based on the first eDRX cycle and the second eDRX cycle. For details, refer to the foregoing description.

Particularly, the PH offset $\text{offset}_{PH}$ is determined based on the first eDRX cycle and the second eDRX cycle. For example, the first eDRX cycle and the second eDRX cycle may be substituted into the hyper-system frame number H-SFN formulas corresponding to the PHs, to be specific, Formulas (5-1) and (6). After the values on the right of the equal sign of Formulas (5-1) and (6) are separately obtained, a difference between the two values is calculated to serve as the PH offset $\text{offset}_{PH}$. For example, $\text{offset}_{PH}$=(UE_ID mod $T^1_{eDRX,H}$)−(UE_ID mod $T^2_{eDRX,H}$). Values of UE_ID in Formulas (5-1) and (6) may be the same. If the values of UE_ID in Formulas (5-1) and (6) are different, UE_ID in Formula (5-1) may be replaced with UE_ID1, and UE_ID in Formula (6) may be replaced with UE_ID2. Both UE_ID1 and UE_ID2 may be identifiers of the terminal device. For example, UE_ID1 is a globally unique identifier of the terminal device, UE_ID1 is a temporary identifier of the terminal device, and so on. This is specifically determined based on an actual situation.

For another example, in a possible implementation, the PH offset may be a difference between the first eDRX cycle and the second eDRX cycle.

Particularly, the PH offset $\text{offset}_{PH}$ may be 0 obtained through calculation. In this case, it may be considered that the first PTW and the second PTW are located in a same PH at every interval of a constant quantity of hyper-system frames, that is, the scenario 1.

S503: When determining to page the terminal device, the network device schedules a paging message in the first PTW and/or the second PTW.

How the network device specifically determines whether the terminal device needs to be paged is not limited in this embodiment of this application. For example, in one case, when receiving data or signaling that needs to be sent to the terminal device, the network device determines to page the terminal device. In another case, when receiving a paging message on a core network side, the network device determines to page the terminal device. The foregoing descriptions are merely examples, and there may still be other cases, which are not described herein one by one.

A specific manner in which the network device schedules the paging message is not limited in this embodiment of this application. For example, when the network device determines to schedule the paging message in the first PTW, the network device may send, on a PDCCH in a PO in the first PTW, DCI scrambled by using a P-RNTI, and a PDSCH scheduled by using the DCI includes the paging message for paging the terminal device. It should be noted that, when sending the DCI, the network device further needs to send a corresponding paging message on the PDSCH scheduled by using the DCI. A specific process is not described herein again.

S504: The terminal device monitors a PO in the first PTW and the second PTW.

Specifically, the first PTW and the second PTW each include at least one PO, and one PO includes one or more PDCCH monitoring occasions. The terminal device monitors the one or more PDCCH monitoring occasions in the PO; and if the PDCCH monitored in the PDCCH monitoring occasion includes the DCI scrambled by using the P-RNTI, receives a paging message on the PDSCH scheduled by using the DCI.

It should be noted that, in this embodiment of this application, monitoring a PO may sometimes be monitoring a paging message, and the meanings may be the same.

Before monitoring the PO in the first PTW and the second PTW, the terminal device may first determine a start position of the first PTW and a start position of the second PTW. The start position of the first PTW and the start position of the second PTW may be determined in a plurality of manners, which are separately described below.

Implementation 1:

If the first PH and the second PH are a same PH, the first PTW and the second PTW are located in a same PH. The start position of the first PTW in the first PH is determined based on the first eDRX cycle and an offset. The start position of the second PTW in the first PH (where the first PH and the second PH herein are a same PH) is determined based on the second eDRX cycle.

For example, if the first PH and the second PH are a same PH, the system frame number $SFN_1$ corresponding to the start position of the first PTW in the first PH may satisfy the following formula:

$$SFN_1 = 256 * i^1_{eDRX} i^1_{eDRX} = (\text{floor}(UE\_ID/T^1_{eDRX,H}) + \text{offset}) \bmod 4 \qquad (7)$$

$T^1_{eDRX,H}$ indicates the first eDRX cycle, UE_ID is determined based on the identifier of the terminal device, and offset indicates the offset.

For another example, if the first PH and the second PH are a same PH, $SFN_1$ may satisfy the following formula:

$$SFN_1=256*i^1_{eDRX}+\text{offset}, i^1_{eDRX}=\text{floor}(UE\_ID/T^1_{eDRX,H})\bmod 4 \quad (8)$$

It should be noted that the SFN corresponding to the start position of the second PTW in the first PH may be determined according to Formula (2). Details are not described herein again.

If the first PH and the second PH are different PHs, the start position of the first PTW in the first PH is determined based on the first eDRX cycle, and the start position of the second PTW in the second PH is determined based on the second eDRX cycle. Specifically, the SFN corresponding to the start position of the first PTW in the first PH and the SFN corresponding to the start position of the second PTW in the second PH may be separately determined according to Formula (2). Details are not described herein again.

It should be noted that as can be learned according to Formula (2), an SFN corresponding to a start position of a PTW is determined based on an eDRX cycle. Therefore, when the first PTW and the second PTW are located in a same PH, if the start position of the first PTW and the start position of the second PTW that are separately determined according to Formula (2) in the conventional technology are different, the first PTW and the second PTW do not overlap in time domain.

In this embodiment of this application, the offset is used to enable the first PTW and the second PTW to overlap in time domain, so that some POs in the first PTW overlap some POs in the second PTW. Because the first PTW and the second PTW overlap in time domain, total duration in which the terminal device needs to be woken up can be reduced, thereby reducing power consumption of the terminal device. It should be noted that the terminal device is not always in a wake-up mode within the PTW, but is in the wake-up mode at a PO and is in a sleep mode at a position other than the PO.

In addition, because some POs in the first PTW overlap some POs in the second PTW, and two overlapped POs need to be monitored only once, a total quantity of POs that need to be monitored by the terminal device is reduced, thereby reducing the power consumption of the terminal device, and improving paging message monitoring efficiency.

In this embodiment of this application, the offset may have a plurality of implementations. In a first scenario, it is assumed that when the SFN corresponding to the start position of the first PTW in the first PH satisfies Formula (7), the offset may be a difference between a second parameter value and a first parameter value. The second parameter value may be used to determine the SFN corresponding to the start position of the second PTW. The first parameter value may be used to determine an SFN corresponding to a start position of a third PTW. The third PTW is a PTW determined in the first PH based on the first eDRX cycle. The third PTW is a PTW determined according to a method (for example, according to Formula (2)) in the conventional technology when the first PTW and the second PTW are located in a same PH, and may be considered as a PTW before the first PTW is offset.

Specifically, the second parameter value may be determined based on the identifier of the terminal device and the second eDRX cycle, and the first parameter value is determined based on the identifier of the terminal device and the first eDRX cycle. For example, the offset may satisfy the following formula:

$$\text{offset}=i^2_{eDRX}-i^1_{eDRX} \quad (9)$$

$i^1_{eDRX}=UE\_ID \bmod T^1_{eDRX,H}$ indicates the first parameter value, $i^2_{eDRX}=UE\_ID \bmod T^2_{eDRX,H}$ indicates the second parameter value, $T^1_{eDRX,H}$ indicates the first eDRX cycle, $T^2_{eDRX,H}$ indicates the second eDRX cycle, and UE_ID is determined based on the identifier of the terminal device. For example, if $i^1_{eDRX}=10$ and $i^2_{eDRX}=15$, with reference to Formula (9), offset=5.

As can be learned with reference to Formula (7) and Formula (9), when the first PH and the second PH are a same PH, the SFN corresponding to the start position of the first PTW is equal to the SFN corresponding to the start position of the second PTW, in other words, the start position of the first PTW and the start position of the second PTW overlap.

Figure 7:
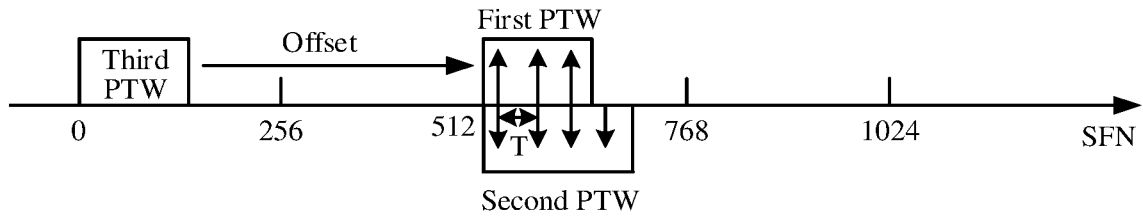
FIG. 7 is a schematic diagram of a position relationship between a first PTW and a second PTW according to an embodiment of this application.

For example, if a value of $UE\_ID \bmod T^1_{eDRX,H}$ is 4, and a value of $UE\_ID \bmod T^2_{eDRX,H}$ is 6, a window length of the first PTW is less than a window length of the second PTW. As shown in FIG. 7, the SFN corresponding to the start position of the second PTW and determined according to Formula (2) is equal to 512, and the SFN corresponding to the start position of the third PTW (the PTW before the first PTW is offset) and determined according to Formula (2) is equal to 0. The SFN corresponding to the start position of the first PTW and determined according to Formula (7) and Formula (9) is equal to 512, in other words, the start position of the first PTW and the start position of the second PTW overlap. As can be learned from FIG. 7, if the first PTW is not offset, duration in which the terminal device needs to be woken up is a sum of the window length of the first PTW and the window length of the second PTW; after the first PTW is offset by the offset, duration in which the terminal device needs to be woken up is the window length of the second PTW, which is less than the sum of the window length of the first PTW and the window length of the second PTW. Therefore, the power consumption of the terminal device can be reduced.

In addition, in the first PTW and the second PTW, the terminal device may determine, according to Formula (3), a PF including a PO, and determine a position of the PO in the PF according to Formula (4), so as to perform monitoring at a start position of the PO. As shown in FIG. 7, it is assumed that one PF includes one PO, and an interval between POs is T. If the first PTW is not offset, a quantity of POs that need to be monitored by the terminal device is X1+X2, where X1 is a quantity of POs included in the first PTW, and X2 is a quantity of POs included in the second PTW. After the first PTW is offset by the offset, because the start position of the first PTW and the start position of the second PTW overlap, and a monitoring cycle in each of the first PTW and the second PTW is T, positions of the plurality of POs in the first PTW and positions of the plurality of POs in the second PTW overlap. In this way, a total quantity of POs that need to be monitored by the terminal device can be reduced, thereby further reducing the power consumption of the terminal device. In FIG. 7, a quantity of POs that need to be monitored by the terminal device is X2, which is far less than X1+X2.

It should be noted that in the foregoing descriptions, the example in which the start position of the first PTW and the start position of the second PTW overlap is used for description. In the embodiments of this application, the first PTW and the second PTW may be enabled to overlap in time domain in another manner by using an offset. For example, a central position of the first PTW and a central position of the second PTW overlap, or an end position of the first PTW and an end position of the second PTW overlap. Examples are not described one by one herein.

Second scenario: In the second scenario, it is assumed that the SFN corresponding to the start position of the first PTW satisfies Formula (8). In this case, a value range of the offset may be greater than a first threshold and less than a second threshold. Specifically, the value range of the offset may satisfy the following formula:

$$SFN_2-SFN_{END3}<\text{offset}<SFN_{END2}-SFN_3 \quad (10)$$

$SFN_2-SFN_{END3}$ indicates the first threshold, $SFN_{END2}-SFN_3$ indicates the second threshold, $SFN_3$ indicates the SFN corresponding to the start position of the third PTW, $SFN_2$ indicates the SFN corresponding to the start position of the second PTW, $SFN_{END3}$ indicates an SFN corresponding to the end position of the third PTW, and $SFN_{END2}$ indicates an SFN corresponding to the end position of the second PTW.

Figure 8:
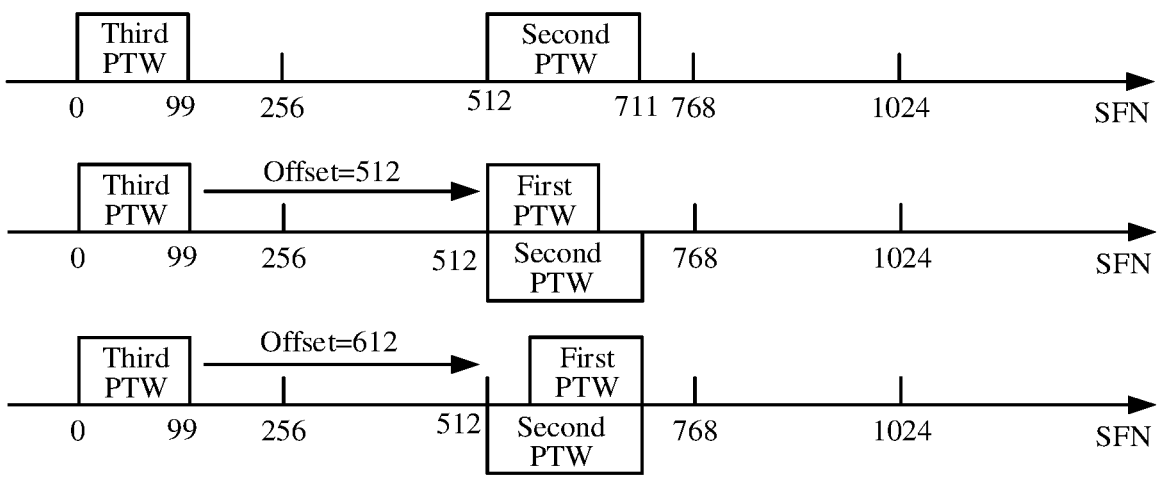
FIG. 8 is a schematic diagram of a position relationship between a first PTW and a second PTW according to an embodiment of this application.

For example, as shown in FIG. 8, if $SFN_3$ is 0, $SFN_{END3}$ is 99, $SFN_2$ is 512, and $SFN_{END2}$ is 512, and SFNEND2 is 711, 413<offset<711. It is assumed that the start position of the first PTW and the start position of the second PTW need to overlap by using the offset, the offset may be 512. It is assumed that the end position of the first PTW and the end position of the second PTW need to overlap by using the offset, the offset may be 612. Other cases may be deduced by analogy, and details are not described again.

Figure 9:
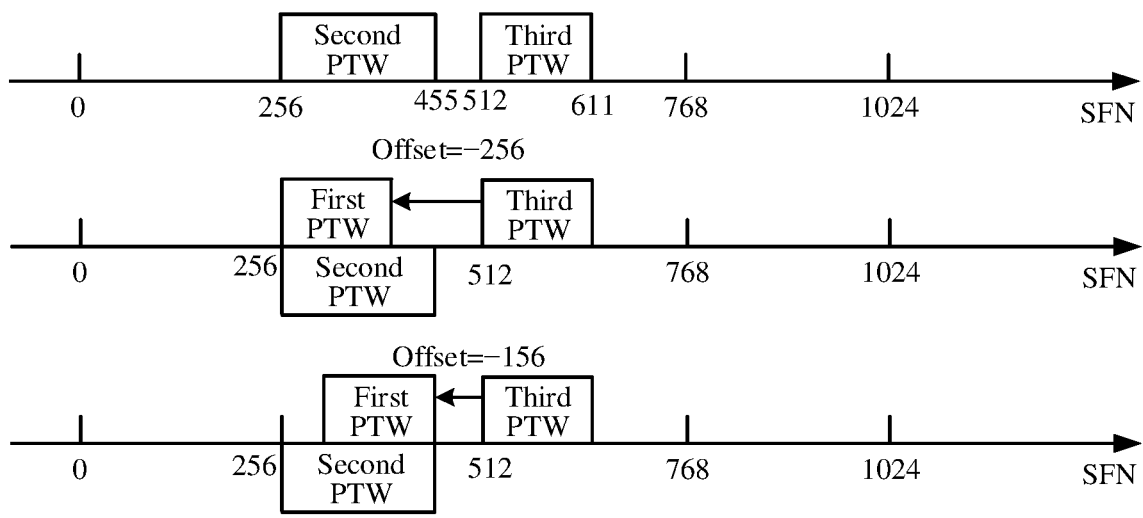
FIG. 9 is a schematic diagram of a position relationship between a first PTW and a second PTW according to an embodiment of this application.

For another example, as shown in FIG. 9, if $SFN_2$ is 256, $SFN_{END2}$ is 455, $SFN_3$ is 512, and $SFN_{END3}$ is 611, −355<offset<−57. It is assumed that the start position of the first PTW and the start position of the second PTW need to overlap by using the offset, the offset may be −256. It is assumed that the end position of the first PTW and the end position of the second PTW need to overlap by using the offset, the offset may be −156. Other cases may be deduced by analogy, and details are not described again.

Implementation 2:

A difference from Implementation 1 is that in Implementation 2, the first PTW and the second PTW do not need to overlap in time domain by using an offset, and signaling overheads do not need to be increased during implementation. Details are described below.

If the first PH and the second PH are a same PH, the first PTW and the second PTW are located in a same PH, and both the start position of the first PTW and the start position of the second PTW are determined based on the first eDRX cycle, or both the start position of the first PTW and the start position of the second PTW are determined based on the second eDRX cycle.

Specifically, in this implementation, when the first PTW and the second PTW are located in a same PH, the SFN corresponding to the start position of the first PTW and the SFN corresponding to the start position of the second PTW may satisfy the following formula:

$$SFN=256*i_{eDRX}, i_{eDRX}=\text{floor}(UE\_ID/T_{eDRX,H})\bmod 4 \quad (11)$$

A value of $T_{eDRX,H}$ is the first eDRX cycle or the second eDRX cycle.

Figure 10:
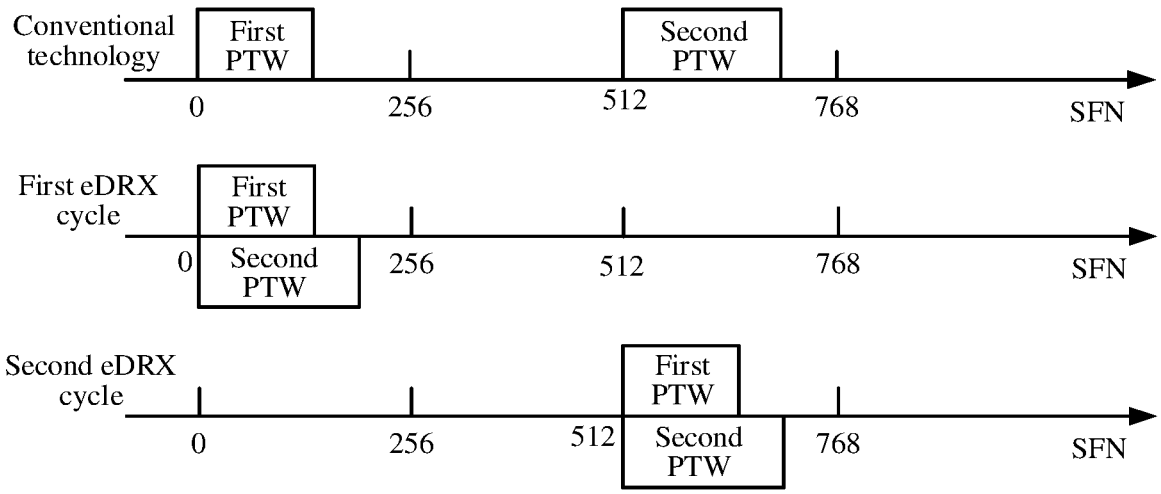
FIG. 10 is a schematic diagram of a position relationship between a first PTW and a second PTW according to an embodiment of this application.

For example, it is assumed that a value of UE_ID mod $T^1_{eDRX,H}$ is 4, and a value of UE_ID mod $T^2_{eDRX,H}$ is 6. As shown in FIG. 10, according to the method in the conventional technology, the SFN corresponding to the start position of the first PTW is equal to 0, the SFN corresponding to the start position of the second PTW is equal to 512, and the first PTW and the second PTW do not overlap. According to the method provided in this application, when the value of $T_{eDRX,H}$ is $T^1_{eDRX,H}$, the SFN corresponding to the start position of the first PTW and the SFN corresponding to the start position of the second PTW are both equal to 0; or when the value of $T_{eDRX,H}$ is $T^2_{eDRX,H}$, the SFN corresponding to the start position of the first PTW and the SFN corresponding to the start position of the second PTW are both equal to 512.

Because the start position of the first PTW and the start position of the second PTW are determined by using the same $T_{eDRX,H}$, the start position of the first PTW and the start position of the second PTW definitely overlap. Therefore, a wake-up time of the terminal device can be reduced while the signaling overheads are reduced, and the total quantity of POs monitored by the terminal device is reduced, thereby reducing the power consumption of the terminal device.

It should be noted that in another case, if the first PH and the second PH are different PHs, the start position of the first PTW in the first PH is determined based on the first eDRX cycle, and the start position of the second PTW in the second PH is determined based on the second eDRX cycle. Specifically, the SFN corresponding to the start position of the first PTW in the first PH and the SFN corresponding to the start position of the second PTW in the second PH may be separately determined according to Formula (2). Details are not described herein again.

In this embodiment of this application, when a RAN paging message is monitored, a PTW may alternatively not be configured. In this case, the terminal device monitors a paging message at a RAN paging cycle according to the solution shown in FIG. 4(b). Details are described below.

Figure 11:
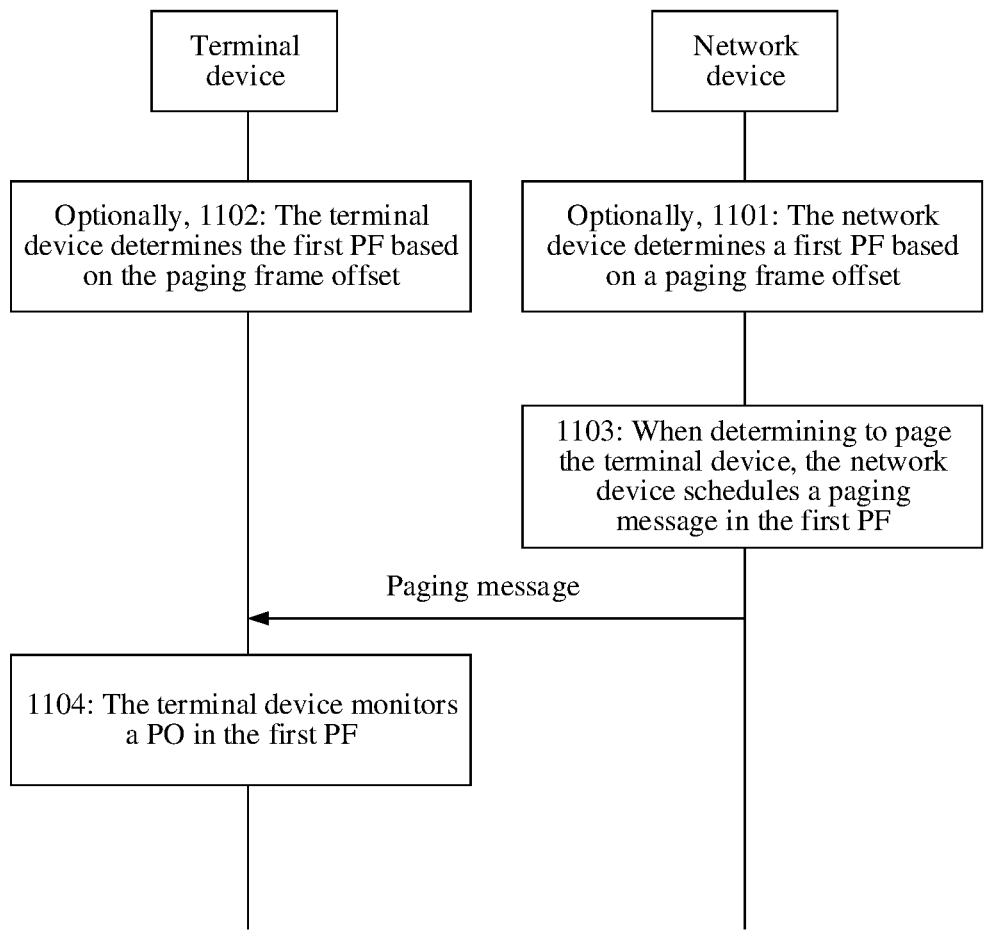
FIG. 11 is a schematic flowchart of a communication method according to an embodiment of this application.

FIG. 11 is a schematic flowchart of a communication method according to an embodiment of this application.

In the procedure in FIG. 11, a RAN paging cycle is used to receive a RAN paging message, and a second eDRX cycle is used to receive a CN paging message. When monitoring the RAN paging message, a terminal device monitors a paging message based on the RAN paging cycle. When monitoring the CN paging message, the terminal device enters a sleep mode outside a second PTW in the second eDRX cycle, and the terminal device monitors a paging message based on a cycle T inside the second PTW. As shown in FIG. 11, the method includes the following steps.

Optionally, S1101: A network device determines a first PF based on a paging frame offset.

Optionally, S1102: The terminal device determines the first PF based on the paging frame offset.

The first PF and the second PF are the same. The first PF is a PF located in the RAN paging cycle. The second PF is any PF in a PTW in the second eDRX cycle. An execution sequence of S1101 and S1102 is not limited. S1101 and S1102 may be performed sequentially or simultaneously.

It should be noted that, that the first PF and the second PF are the same means that a system frame number of the first PF is the same as a system frame number of the second PF. The terminal device may be in an RRC inactive mode.

It should be noted that before S1101, the network device may configure information such as the RAN paging cycle and the second eDRX cycle for the terminal device. For example, the network device may send first configuration information to the terminal device, and the first configuration information includes information such as the RAN paging cycle.

The first configuration information may be carried by using an RRC connection release message or an RRC release message. The first configuration information may further include a paging frame offset. When the network device does not configure the paging frame offset for the terminal device, the paging frame offset may be determined by the terminal device, or may be determined in another manner. This is not limited in this embodiment of this application.

The network device may further send second configuration information to the terminal device, and the second configuration information includes the second eDRX cycle. The second configuration information may further indicate other information, for example, indicate information such as a window length of the second PTW in the second eDRX cycle. The second configuration information may be carried in an attach request message in an attach process, or the second configuration information may be carried in a TAU request message in a TAU process.

As can be learned with reference to the foregoing descriptions, the RAN paging cycle includes one PF; and the second PTW in the second eDRX cycle includes a plurality of PFs, and an interval between two adjacent PFs is T, where T is the smallest value among the RAN paging cycle, a specific paging cycle of the terminal device, and a default paging cycle.

It should be noted that a quantity of POs included in one PF in the RAN paging cycle is equal to a quantity of POs included in one PF in the second eDRX cycle, both are Ns, and Ns is an integer greater than 0.

In this embodiment of this application, the paging frame offset is used to compensate for an interval between a PF in the RAN paging cycle and a PF in the second eDRX cycle, so that the PF in the RAN paging cycle overlaps the PF in the second eDRX cycle. Therefore, a total quantity of POs that need to be monitored by the terminal device in the PF is reduced, thereby reducing power consumption of the terminal device, and improving paging message monitoring efficiency.

A specific implementation of the paging frame offset is not limited in this embodiment of this application. In a possible implementation, the paging frame offset is a difference between a frame number of the second PF and a frame number of a third PF, and the third PF is a PF determined based on the first eDRX cycle. The third PF may be a PF before the first PF is offset by the paging frame offset.

For example, the paging frame offset PF_offset1 may satisfy the following formula:

$$\text{PF\_offset1}=\text{SFN}^2-\text{SFN}^3 \quad (12)$$

$\text{SFN}^2$ indicates the system frame number of the second PF, and $\text{SFN}^3$ indicates the system frame number of the third PF.

The system frame number of the second PF may satisfy the following formula:

$$(\text{SFN}^2+\text{PF\_offset})\bmod T=(T \text{ div } N1)*(\text{UE\_ID} \bmod N1) \quad (13)$$

The system frame number of the third PF may satisfy the following formula:

$$(\text{SFN}^3+\text{PF\_offset})\bmod T\_rp=(T\_rp \text{ div } N2)*(\text{UE\_ID} \bmod N2) \quad (14)$$

PF_offset is used to determine an offset of a PF, T_rp indicates the RAN paging cycle, N1 indicates a total quantity of PFs included in the second eDRX cycle, N2 indicates a total quantity of PFs included in a cycle T, and UE_ID is determined based on an identifier of the terminal device. In this embodiment of this application, the network device may send an SIB1 to the terminal device. The SIB1 includes parameters such as PF_offset, N1, and N2.

With reference to the foregoing example, the system frame number $\text{SFN}^1$ of the first PF may satisfy the following formula:

$$(\text{SFN}^1+\text{PF\_offset}+\text{PF\_offset1})\bmod T\_rp=(T\_rp \text{ div } N2)*(\text{UE\_ID} \bmod N2) \quad (15)$$

PF_offset1 indicates a paging frame offset.

Figure 12:
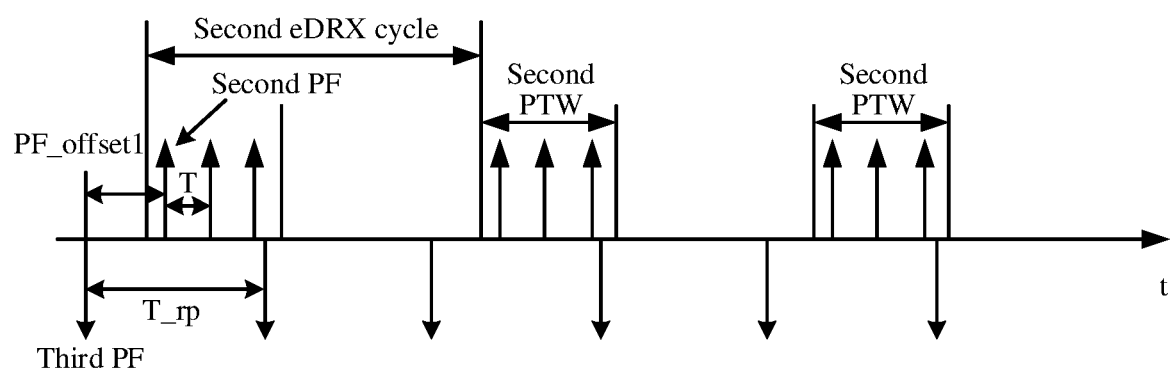
FIG. 12 is a schematic diagram of monitoring according to an embodiment of this application.
Figure 13:
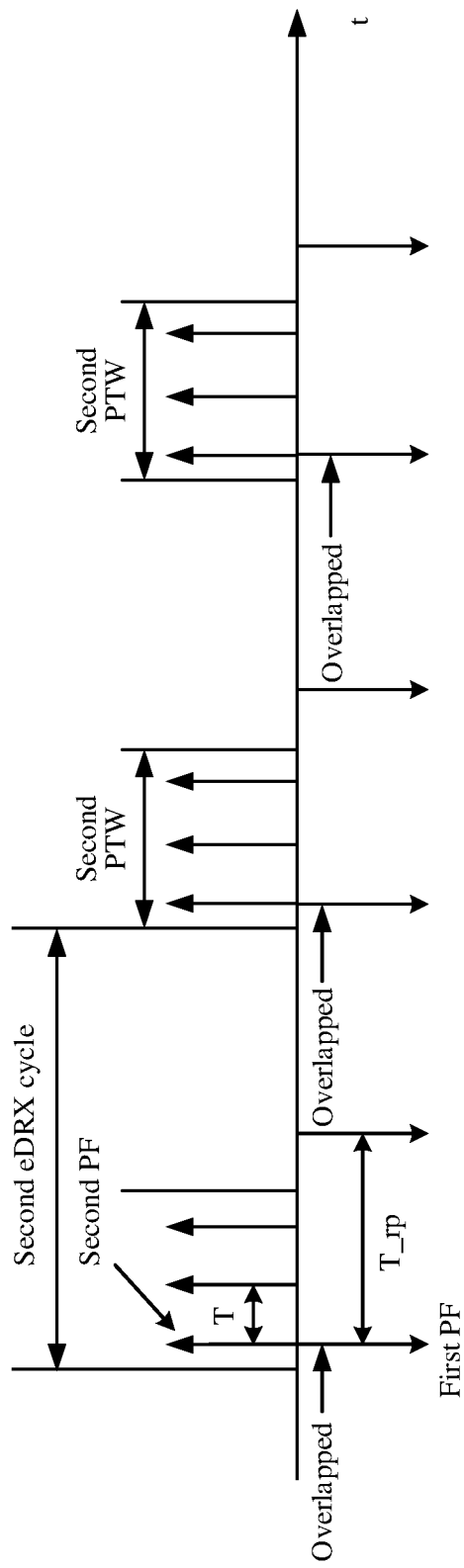
FIG. 13 is a schematic diagram of monitoring according to an embodiment of this application.

For example, FIG. 12 is a schematic diagram of a method in a conventional technology. A position relationship between a third PF and a second PF is determined. In this embodiment of this application, as shown in FIG. 13, an interval between the third PF and the second PF may be used as a paging offset to offset the third PF, so that the first PF (the third PF obtained after the offset) overlaps the second PF, thereby reducing a total quantity of POs that need to be monitored by a terminal device in a PF, and reducing power consumption of the terminal device.

It should be noted that positions of POs in the first PF and the second PF may be determined according to Formula (4). Details are not described herein again.

S1103: When determining to page the terminal device, the network device schedules a paging message in the first PF.

S1104: The terminal device monitors a PO in the first PF.

For specific processes of S1103 and S1104, refer to the foregoing descriptions. Details are not described herein again.

In the foregoing process, the first PF in the RAN paging cycle and the second PF in the second eDRX cycle are enabled to overlap by using the paging frame offset to reduce a quantity of PFs that need to be monitored by the terminal device, thereby reducing a total quantity of POs that need to be monitored, reducing power consumption of the terminal device, and improving paging message monitoring efficiency.

In an existing network, a terminal device of a non-narrowband internet of things (NB-JOT) can run in an eDRX mode only when the eDRX mode is configured and the network supports the eDRX mode. In the eDRX mode, a minimum value of the eDRX cycle is 5.12 seconds (s). When the eDRX cycle configured to be 5.12 s, the terminal device monitors a PO every 5.12 s. An SFN in which the PO is located satisfies the following formula, where T=5.12 s:

$$(\text{SFN}+\text{PF\_offset})\bmod T=(T \text{ div } N)*(\text{UE\_ID} \bmod N) \quad (16)$$

The minimum value of the eDRX cycle is 5.12 s. Therefore, when the terminal device is in the eDRX mode, the terminal device may not receive a message of an emergency broadcast service within a specified time (for example, 4 s). In view of this, this application may provide a method to resolve this problem.

In this embodiment of this application, an eDRX cycle less than 5.12 s is introduced. A value of the eDRX cycle less than 5.12 s may be 2.56 s or the like. This is not limited in this embodiment of this application.

Figure 14:
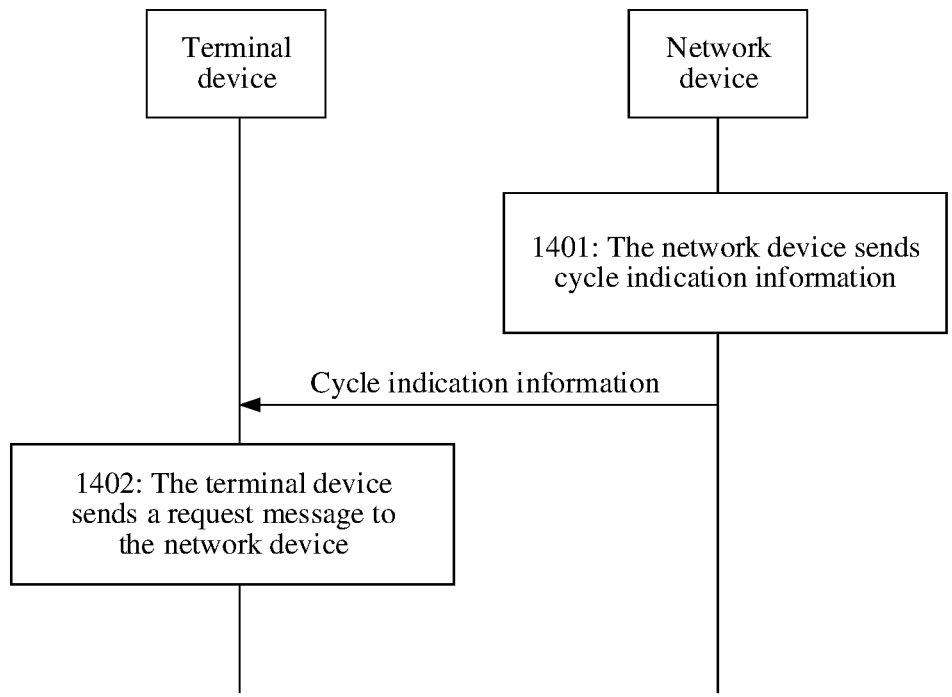
FIG. 14 is a schematic flowchart of a communication method according to an embodiment of this application.

For ease of description, an eDRX cycle less than 5.12 s is referred to as a mini cycle in the following description. For example, mini cycle=2.56 s. As shown in FIG. 14, the method includes the following steps.

S1401: A network device sends cycle indication information.

The cycle indication information indicates an eDRX cycle configuration supported by the network device. The eDRX cycle configuration supported by the network device includes at least an eDRX cycle less than 5.12 s, for example, an eDRX cycle supporting 2.56 s.

The network device may send the cycle indication information in a broadcast or unicast manner.

S1402: A terminal device sends a request message to the network device, where the request message is used to request to configure an eDRX cycle less than 5.12 s.

The request message may be non-access stratum (NAS) signaling. When supporting eDRX and requesting to use eDRX, the terminal device may request, by using the NAS signaling, to configure an eDRX cycle to be less than 5.12 s, for example, request to configure the eDRX cycle to be 2.56 s.

For example, the NAS signaling may be a registration request (REGISTRATION REQUEST) message, the requested eDRX cycle is added to the registration request message and is set to 2.56 s.

It should be noted that if the network device does not send the cycle indication information or does not indicate, to the terminal device, that the eDRX cycle configuration supported by the network device includes the eDRX cycle less than 5.12 s, the terminal device requests to set the minimum value of the eDRX cycle to 5.12 s.

According to the method, the terminal device can reduce more power consumption by staying in the sleep mode for a longer time compared with a DRX cycle, and can support reception of an emergency broadcast service.

In the foregoing embodiments provided in this application, the methods provided in the embodiments of this application are separately described from a perspective of interaction between devices. To implement various functions in the foregoing methods provided in the embodiments of this application, the network device or the terminal device may include a hardware structure and/or software. The foregoing functions are implemented in a form of a hardware structure, a software module, or a hardware structure plus a software module. Whether a function in the foregoing functions is performed by using a hardware structure, a software module, or a hardware structure plus a software module depends on a specific application and a design constraint of a technical solution.

The module division in the embodiments of this application is an example, and is merely logical function division. During actual implementation, another division manner may be used. In addition, the functional modules in the embodiments of this application may be integrated into one processor, or may exist separately physically. Alternatively, two or more modules may be integrated into one module. The foregoing integrated module may be implemented in a form of hardware, or may be implemented in a form of a software functional module.

Figure 15:
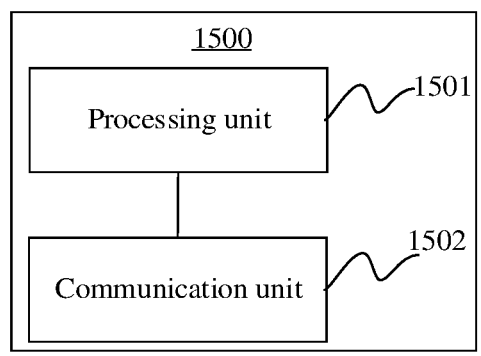
FIG. 15 is a schematic diagram of a structure of a communication apparatus according to an embodiment of this application.

Same as the foregoing concept, as shown in FIG. 15, an embodiment of this application further provides an apparatus 1500, configured to implement functions of the network device or the terminal device in the foregoing methods. For example, the apparatus may be a software module or a chip system. In this embodiment of this application, the chip system may include a chip, or may include a chip and another discrete device. The apparatus 1500 may include a processing unit 1501 and a communication unit 1502.

In this embodiment of this application, the communication unit may also be referred to as a transceiver unit, and may include a sending unit and/or a receiving unit, respectively configured to perform sending and receiving steps of the network device or the terminal device in the foregoing method embodiments.

Figure 16:
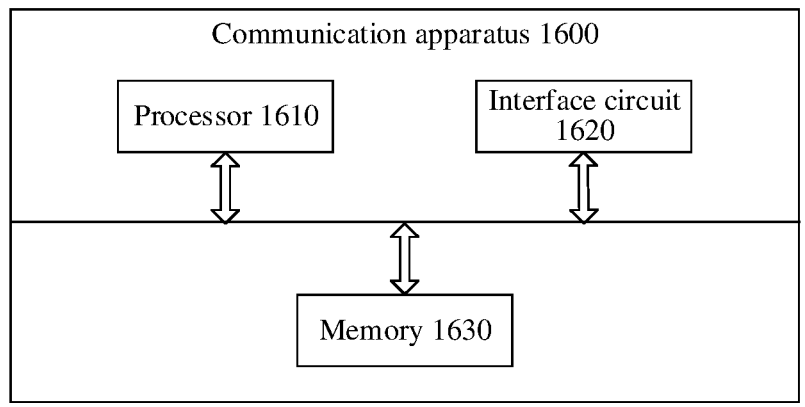
FIG. 16 is a schematic diagram of a structure of a communication apparatus according to an embodiment of this application.

With reference to FIG. 15 to FIG. 16, the following describes in detail a communication apparatus provided in an embodiment of this application. It should be understood that the description of the apparatus embodiment corresponds to the description of the method embodiments. Therefore, for content that is not described in detail, refer to the foregoing method embodiments. For brevity, details are not described herein again.

The communication unit may also be referred to as a transceiver, a transceiver device, a transceiver apparatus, or the like. The processing unit may also be referred to as a processor, a processing board, a processing module, a processing apparatus, or the like. Optionally, a component, configured to implement a receiving function, in the communication unit 1502 may be considered as a receiving unit, and a component, configured to implement a sending function, in the communication unit 1502 may be considered as a sending unit. In other words, the communication unit 1502 includes a receiving unit and a sending unit. The communication unit sometimes may also be referred to as a transceiver, a transceiver device, a transceiver circuit, or the like. The receiving unit may also be referred to as a receiver, a receiver device, a receiving circuit, or the like. The sending unit may also be referred to as a transmitter, a transmitter device, a transmitter circuit, or the like.

When the communication apparatus 1500 performs functions of the terminal device in the procedure shown in FIG. 5 in the foregoing embodiment:
  the processing unit is configured to: determine a first paging hyperframe PH based on a first extended discontinuous reception eDRX cycle, and determine a second PH based on a second eDRX cycle, where the first PH includes a first paging time window PTW, and the second PH includes a second PTW; and
  the communication unit is configured to monitor a PO in the first PTW and the second PTW.

If the first PH and the second PH are a same PH, a start position of the first PTW in the first PH is determined based on the first eDRX cycle and an offset. Alternatively, if the first PH and the second PH are a same PH, both a start position of the first PTW and a start position of the second PTW are determined based on the first eDRX cycle, or both a start position of the first PTW and a start position of the second PTW are determined based on the second eDRX cycle.

When the communication apparatus 1500 performs functions of the network device in the procedure shown in FIG. 5 in the foregoing embodiment:
  the processing unit is configured to: determine a first paging hyperframe PH based on a first extended discontinuous reception eDRX cycle, and determine a second PH based on a second eDRX cycle, where the first PH includes a first paging time window PTW, and the second PH includes a second PTW; and
  the communication unit is configured to schedule a paging message in the first PTW and/or the second PTW when determining to page the terminal device.

If the first PH and the second PH are a same PH, a start position of the first PTW in the first PH is determined based on the first eDRX cycle and an offset. Alternatively, if the first PH and the second PH are a same PH, both a start position of the first PTW and a start position of the second PTW are determined based on the first eDRX cycle, or both a start position of the first PTW and a start position of the second PTW are determined based on the second eDRX cycle.

When the communication apparatus 1500 performs functions of the terminal device in the procedure shown in FIG. 11 in the foregoing embodiment:
  the processing unit is configured to determine a first paging frame PF based on a paging frame offset, where the first PF and a second PF are a same PF, the first PF is a PF located in a radio access network RAN paging cycle, and the second PF is any PF in a paging time window PTW in a second eDRX cycle; and the communication unit is configured to monitor a PO in the first PF.

When the communication apparatus 1500 performs functions of the network device in the procedure shown in FIG. 11 in the foregoing embodiment:

the processing unit is configured to determine a first paging frame PF based on a paging frame offset, where the first PF and a second PF are a same PF, the first PF is a PF located in a radio access network RAN paging cycle, and the second PF is any PF in a paging time window PTW in a second eDRX cycle; and the communication unit is configured to schedule a paging message in the first PF when determining to page the terminal device.

The foregoing descriptions are merely examples. The processing unit 1501 and the communication unit 1502 may further perform other functions. For more detailed descriptions, refer to related descriptions in the method embodiments shown in FIG. 5 to FIG. 11. Details are not described herein again.

FIG. 16 shows an apparatus 1600 according to an embodiment of this application. The apparatus shown in FIG. 16 may be an implementation of a hardware circuit of the apparatus shown in FIG. 15. The communication apparatus is applicable to the foregoing flowcharts, and performs functions of the terminal device or the network device in the foregoing method embodiments. For ease of description, FIG. 16 shows only main components of the communication apparatus.

As shown in FIG. 16, the communication apparatus 1600 includes a processor 1610 and an interface circuit 1620. The processor 1610 and the interface circuit 1620 are coupled to each other. It can be understood that the interface circuit 1620 may be a transceiver or an input/output interface. Optionally, the communication apparatus 1600 may further include a memory 1630, configured to: store instructions executed by the processor 1610, store input data required by the processor 1610 to run the instructions, or store data generated after the processor 1610 runs the instructions.

When the communication apparatus 1600 is configured to implement the methods shown in FIG. 3 to FIG. 6, the processor 1610 is configured to implement functions of the processing unit 1501, and the interface circuit 1620 is configured to implement functions of the communication unit 1502.

When the foregoing communication apparatus is a chip applied to a terminal device, the chip of the terminal device implements functions of the terminal device in the foregoing method embodiments. The chip of the terminal device receives information from another module (for example, a radio frequency module or an antenna) in the terminal device, where the information is sent by a network device to the terminal device; or the chip of the terminal device sends information to another module (for example, a radio frequency module or an antenna) in the terminal device, where the information is sent by the terminal device to a network device.

When the foregoing communication apparatus is a chip applied to a network device, the chip of the network device implements functions of the network device in the foregoing method embodiments. The chip of the network device receives information from another module (for example, a radio frequency module or an antenna) in the network device, where the information is sent by a terminal device to the network device; or the chip of the network device sends information to another module (for example, a radio frequency module or an antenna) in the network device, where the information is sent by the network device to a terminal device.

It can be understood that the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The processor in this embodiment of this application may be a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well known in the art. An example storage medium is coupled to the processor, so that the processor can read information from the storage medium and can write information to the storage medium. Certainly, the storage medium may alternatively be a component of the processor. The processor and the storage medium may be located in an ASIC. In addition, the ASIC may be located in a network device or a terminal device. Alternatively, the processor and the storage medium may exist in a network device or a terminal device as discrete components.

A person skilled in the art should be aware that the embodiments of this application may be provided as methods, systems, or computer program products. Therefore, this application may be in a form of an entire hardware embodiment, an entire software embodiment, or an embodiment combining software and hardware aspects. In addition, this application may use a form of a computer program product implemented on one or more computer available storage media (including but not limited to a magnetic disk storage, an optical memory, and the like) including computer available program code.

This application is described with reference to flowcharts and/or block diagrams of the methods, the devices (systems), and the computer program product according to this application. It should be understood that each procedure and/or block in the flowcharts and/or the block diagrams and/or a combination of procedures and/or blocks in the flowcharts and/or the block diagrams may be implemented by using computer program instructions. These computer program instructions may be provided to a processor of a general-purpose computer, a special-purpose computer, an embedded processor, or another programmable data processing device to produce a machine, so that the instructions executed by a processor of a computer or another programmable data processing device generates an apparatus for implementing a function specified in one or more procedures in a flowchart and/or in one or more blocks in a block diagram.

These computer program instructions may also be stored in a computer-readable memory that directs a computer or another programmable data processing device to operate in a particular manner, so that the instructions stored in the computer-readable memory produce an article of manufacture including an instruction apparatus. The instruction apparatus implements a function specified in one or more procedures in a flowchart and/or in one or more blocks in a block diagram.

It is clear that a person skilled in the art may make various modifications and variations to this application without departing from the scope of this application. In this way, if these modifications and variations of this application fall within the scope of the claims of this application and their equivalent technologies, this application is also intended to cover these modifications and variations.

What is claimed is:

1. A communication method, wherein the method is applied to a terminal device and comprises:
   determining a first paging hyperframe (PH) based on a first extended discontinuous reception (eDRX) cycle, wherein the first PH comprises a first paging time window (PTW);
   determining a second PH based on a second eDRX cycle, wherein the second PH comprises a second PTW; and
   monitoring a paging occasion (PO) in the first PTW and the second PTW, wherein, based on the first PH and the second PH being a same PH, a start position of the first PTW in the first PH is determined based on the first eDRX cycle and an offset.

2. The method according to claim 1, wherein the first PTW and the second PTW overlap in time domain.

3. The method according to claim 1, wherein the offset is a difference between a second parameter value and a first parameter value; and
   the second parameter value is determined based on an identifier of the terminal device and the second eDRX cycle, and the first parameter value is determined based on the identifier of the terminal device and the first eDRX cycle.

4. The method according to claim 3, wherein a system frame number (SFN) corresponding to a start position of the second PTW is determined based on the second parameter value; and
   an SFN corresponding to a start position of a third PTW is determined based on the first parameter value, and the third PTW is a PTW determined in the first PH based on the first eDRX cycle.

5. The method according to claim 1, wherein the offset is greater than a first threshold and less than a second threshold; and
   the first threshold is a difference between an SFN corresponding to a start position of the second PTW and an SFN corresponding to an end position of a third PTW, the second threshold is a difference between an SFN corresponding to an end position of the second PTW and an SFN corresponding to a start position of the third PTW, and the third PTW is a PTW determined in the first PH based on the first eDRX cycle.

6. The method according to claim 1, wherein at least one of the first eDRX cycle, the second eDRX cycle, or the offset is from a network device.

7. The method according to claim 1, wherein, based on the first PH and the second PH being different PHs, the start position of the first PTW in the first PH is determined based on the first eDRX cycle.

8. The method according to claim 1, wherein the determining the first PH based on the first eDRX cycle comprises:
   determining the first PH based on the first eDRX cycle and a PH offset, wherein the PH offset is determined based on the first eDRX cycle and the second eDRX cycle.

9. A communication method, comprising:
   determining, by a terminal device, a first paging frame (PF) based on a paging frame offset, wherein the first PF and a second PF are a same PF, the first PF is a PF in a radio access network (RAN) paging cycle, and the second PF is any PF in a paging time window (PTW) in a second extended discontinuous reception (eDRX) cycle; and
   monitoring a paging occasion (PO) in the first PF.

10. The method according to claim 9, wherein the paging frame offset is a difference between a frame number of the second PF and a frame number of a third PF, and the third PF is a PF determined based on the RAN paging cycle.

11. A communication apparatus, comprising:
    a processing unit, configured to:
       determine a first paging hyperframe (PH) based on a first extended discontinuous reception (eDRX) cycle, wherein the first PH comprises a first paging time window (PTW); and
       determine a second PH based on a second eDRX cycle, wherein the second PH comprises a second PTW; and
    a communication unit, configured to:
       monitor a paging occasion (PO) in the first PTW and the second PTW, wherein, based on the first PH and the second PH being a same PH, a start position of the first PTW in the first PH is determined based on the first eDRX cycle and an offset.

12. The apparatus according to claim 11, wherein the first PTW and the second PTW overlap in time domain.

13. The apparatus according to claim 11, wherein the offset is a difference between a second parameter value and a first parameter value; and
    wherein the second parameter value is determined based on an identifier of a terminal device and the second eDRX cycle, and the first parameter value is determined based on the identifier of the terminal device and the first eDRX cycle.

14. The apparatus according to claim 13, wherein a system frame number (SFN) corresponding to a start position of the second PTW is determined based on the second parameter value; and
    an SFN corresponding to a start position of a third PTW is determined based on the first parameter value, and the third PTW is a PTW determined in the first PH based on the first eDRX cycle.

15. The apparatus according to claim 11, wherein the offset is greater than a first threshold and less than a second threshold; and
    the first threshold is a difference between an SFN corresponding to a start position of the second PTW and an SFN corresponding to an end position of a third PTW, the second threshold is a difference between an SFN corresponding to an end position of the second PTW and an SFN corresponding to a start position of the third PTW, and the third PTW is a PTW determined in the first PH based on the first eDRX cycle.

16. The apparatus according to claim 11, wherein at least one of the first eDRX cycle, the second eDRX cycle, or the offset is from a network device.

17. The apparatus according to claim 11, wherein, based on the first PH and the second PH being different PHs, the start position of the first PTW in the first PH is determined based on the first eDRX cycle.

18. The apparatus according to claim 11, wherein the processing unit being configured to determine the first PH based on the first eDRX cycle further comprises the processing unit being configured to:

determine the first PH based on the first eDRX cycle and a PH offset, wherein the PH offset is determined based on the first eDRX cycle and the second eDRX cycle.

\* \* \* \* \*

UNITED STATES PATENT AND TRADEMARK OFFICE
CERTIFICATE OF CORRECTION

PATENT NO. : 12,477,517 B2  
APPLICATION NO. : 18/351111  
DATED : November 18, 2025  
INVENTOR(S) : Xiang et al.

Page 1 of 1

It is certified that error appears in the above-identified patent and that said Letters Patent is hereby corrected as shown below:

On the Title Page

Item (63), in Column 1, under "Related U.S. Application Data", Line 2, below "PCT/CN2021/086723, filed on Apr. 12, 2021." insert:
-- (30) Foreign Application Priority Data
Jan. 13, 2021 (WO) ……………… PCT/CN2021/071548 --.

Signed and Sealed this  
Third Day of February, 2026

John A. Squires  
*Director of the United States Patent and Trademark Office*